United States Patent
Verma et al.

(10) Patent No.: US 10,487,750 B2
(45) Date of Patent: Nov. 26, 2019

(54) SYSTEM AND METHOD FOR PREDICTING AND ENHANCING POWER PLANT STARTUP TIME

(71) Applicant: General Electric Company, Schenectady, NY (US)

(72) Inventors: Rajeev Kumar Verma, Hyderabad (IN); Vikram Srinivasa Muralidharan, Hyderabad (IN); Pramod Kumar Yadav, Hyderabad (IN); Bryan Edward Sweet, Schenectady, NY (US); David August Snider, Greenville, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 194 days.

(21) Appl. No.: 15/442,984

(22) Filed: Feb. 27, 2017

(65) Prior Publication Data
US 2018/0245519 A1   Aug. 30, 2018

(51) Int. Cl.
*F02C 9/00* (2006.01)
*F02C 6/04* (2006.01)
(Continued)

(52) U.S. Cl.
CPC ............ *F02C 9/00* (2013.01); *F01K 13/02* (2013.01); *F02C 6/04* (2013.01); *F02C 6/18* (2013.01);
(Continued)

(58) Field of Classification Search
CPC ...... F02C 9/00; F02C 9/28; F02C 7/26; F02C 6/18; F02C 6/04; G05B 13/0265;
(Continued)

(56) References Cited

U.S. PATENT DOCUMENTS

| 8,844,295 B2 | 9/2014 | Snider et al. |
| 2011/0196593 A1* | 8/2011 | Jiang ................ F02C 9/00 701/100 |

(Continued)

FOREIGN PATENT DOCUMENTS

| EP | 2 410 154 A2 | 1/2012 |
| EP | 2 899 384 A1 | 7/2015 |
| EP | 2 937 519 A1 | 10/2015 |

OTHER PUBLICATIONS

Hamid Asgari, Modeling and Simulation of the Start-Up Operation of a Heavy-Duty Gas Turbine by Using Narx Models, Copyright © 2014 by ASME 1Department of Mechanical Engineering, University of Canterbury, Christchurch, New Zealand 2Departnnent of Mathematics and Statistics (Year: 2014).*

(Continued)

*Primary Examiner* — Juan C Ochoa
(74) *Attorney, Agent, or Firm* — Fletcher Yoder, P.C.

(57) ABSTRACT

A non-transitory computer readable storage medium storing one or more processor-executable instructions wherein the one or more instructions when executed by a processor of a controller, cause acts to be performed is provided. The acts to be performed include obtaining one or more signals representative of ambient conditions and one or more operating conditions of the gas turbine engine, executing a model to predict a duration of a startup time for the gas turbine engine based on the ambient conditions and the one or more operating conditions, and causing a display to display the predicted duration of the startup time of the gas turbine engine.

17 Claims, 5 Drawing Sheets

(51) Int. Cl.
- *G05B 13/02* (2006.01)
- *F02C 9/28* (2006.01)
- *F01K 13/02* (2006.01)
- *F02C 6/18* (2006.01)
- *F02C 7/26* (2006.01)

(52) U.S. Cl.
CPC .................. *F02C 7/26* (2013.01); *F02C 9/28* (2013.01); *G05B 13/024* (2013.01); *G05B 13/0265* (2013.01); *F05D 2220/32* (2013.01); *F05D 2260/81* (2013.01); *F05D 2260/82* (2013.01); *F05D 2260/85* (2013.01); *F05D 2270/20* (2013.01); *Y02E 20/16* (2013.01)

(58) Field of Classification Search
CPC ....... G05B 13/024; F01K 13/02; Y02E 20/16; F05D 2260/81; F05D 2260/82; F05D 2270/20; F05D 2260/85; F05D 2220/32
USPC ........................................................ 703/7, 2
See application file for complete search history.

(56) References Cited

U.S. PATENT DOCUMENTS

| | | |
|---|---|---|
| 2012/0290225 A1 | 11/2012 | Julian et al. |
| 2013/0030582 A1 | 1/2013 | Chamblin et al. |
| 2014/0260288 A1 | 9/2014 | D'Amato et al. |
| 2016/0281607 A1* | 9/2016 | Asati .................. F02C 9/28 |

OTHER PUBLICATIONS

Ashikaga et al., 'A study on applying nonlinear control to gas turbine systems', 2003, Proceedings of the International Gas Turbine Congress, Tokyo, Japan, pp. 1-8.*

Kim et al., Characteristics of transient operation of a dual-pressure bottoming system for the combined cycle power plant, 2001, Energy, vol. 26, pp. 905-918.*

Agrawal et al., A Generalized Mathematical Model to Estimate Gas Turbine Starting Characteristics, 1982, ASME J. Eng. Gas Turbines Power 104, pp. 194-201.*

Extended European Search Report and Opinion issued in connection with corresponding EP Application No. 18158333.7 dated Oct. 17, 2018.

* cited by examiner

SYSTEM AND METHOD FOR PREDICTING AND ENHANCING POWER PLANT STARTUP TIME

BACKGROUND OF THE INVENTION

The subject matter disclosed herein relates to a power plant and, more specifically, systems and methods for predicting and enhancing startup for a power plant.

Certain power plants include a combined cycle. The combined cycle may enable greater energy efficiencies, for example, by capturing energy that would have normally been lost through exhaust heat. Accordingly, a combined cycle may include systems that transform energy from exhaust heat into useful power. Fuel is supplied to a combustor of a gas turbine engine. The gas turbine engine, in turn, drives a generator for the production of electrical power or drives another type of load. Exhaust from the gas turbine engine may be supplied to a heat recovery system (e.g. to generate steam for a steam turbine). As such, the combined cycle power plants may be useful in converting fuel and exhaust heat into power. The startup time of a combined cycle power plant may be largely dependent on various sub components of the power plant such as gas turbines, heat recovery steam generator (HRSG), boiler, duct burners, and a steam turbine. Typically, the startup time up to a full speed no load operating condition of a respective gas turbine engine is fixed regardless of operational scenarios (e.g., ambient conditions, gas turbine operating conditions, etc.). This may limit the efficiency of the power plant.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In accordance with a first embodiment, a non-transitory computer readable storage medium storing one or more processor-executable instructions wherein the one or more instructions when executed by a processor of a controller, cause acts to be performed is provided. The acts to be performed include obtaining one or more signals representative of ambient conditions and one or more operating conditions of the gas turbine engine, executing a model to predict a duration of a startup time for the gas turbine engine based on the ambient conditions and the one or more operating conditions, and causing a display to display the predicted duration of the startup time of the gas turbine engine.

In accordance with a second embodiment, a non-transitory computer readable storage medium storing one or more processor-executable instructions wherein the one or more instructions when executed by a processor of a controller, cause acts to be performed is provided. The acts to be performed include obtaining one or more signals representative of ambient conditions and one or more operating conditions for each gas turbine engine of multiple gas turbine engines of a power plant, executing a model to predict durations for startup times for each gas turbine engine of the multiple gas turbine engines at different times or shifts for a particular time period based on the ambient conditions and the one or more operating conditions, and causing a display to display the predicted durations for the startup times for each gas turbine engine of the multiple gas turbine engines at the different times or shifts during the particular time period.

In a third embodiment, a method is provided. The method includes obtaining, at a processor, one or more signals representative of ambient conditions and one or more operating conditions for each gas turbine engine of multiple gas turbine engines of the power plant. The method also includes executing, on the processor, a model to predict durations for startup times for each gas turbine engine of the multiple gas turbine engines at different times or shifts for a particular time period based on the ambient conditions and the one or more operating conditions. The method further includes causing, via the processor, a display to display the predicted durations for the startup times for each gas turbine engine of the multiple gas turbine engines at the different times or shifts during the particular time period.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The disclosed embodiments include systems and methods for predicting and enhancing (e.g., improving) gas turbine startup times for a power plant (e., combined cycle power plant). The embodiments include utilizing a model (e.g., physics based model) that utilizes ambient conditions and one or more operating conditions for the combined cycle gas turbines to predict and enhance the startup time for each individual combined cycle gas turbine engine of the power plant. In particular, the model (e.g., utilizing at least an exhaust volumetric flow model) may predict and enhance (e.g., improve) a duration of a startup time for each combined cycle gas turbine engine at a current time and future times. In certain embodiments, the model may determine a startup order for gas turbine engines of the power plant. The disclosed embodiments may reduce the startup time for each combined cycle gas turbine engine and the power plant overall. In addition, the disclosed embodiments may forecast the impact of the hardware life consumption of components of the power plant. Further, the disclosed embodiments may reduce and predict the auxiliary power consumed and NOx reduction during startup.

Figure 1:
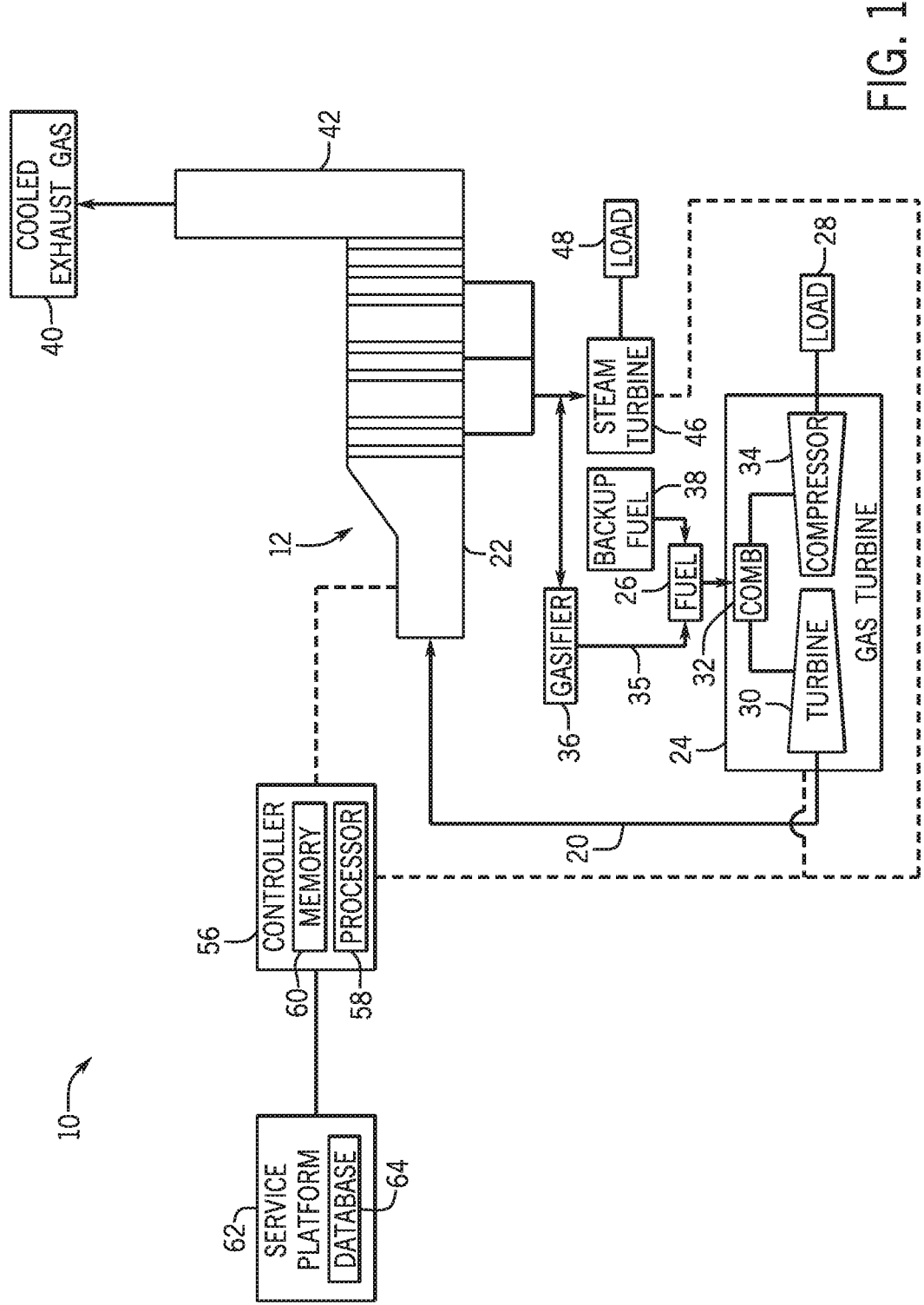
FIG. 1 is a schematic diagram of an embodiment of a combined cycle system having a gas turbine coupled to a heat recovery steam generator (HRSG)

With the foregoing in mind, FIG. 1 is a block diagram of an embodiment of a system 10 (e.g., a combined cycle power plant (CCCP) such as integrated gasification combined cycle (IGCC) power plant) that includes a heat recovery system, such as an HRSG 12 (e.g., once through or duct fired), that may form part of an IGCC system. Although an IGCC system 10 is illustrated, the system may be a different CCCP. The inlet section 22 of the HRSG 12 is fluidly coupled to a gas turbine 24 that supplies the exhaust gas 20 to the HRSG 12. For example, the gas turbine 24 combusts a fuel 26 to drive a first load 28 and generate the exhaust gas 20. The first load 28 may, for instance, be an electrical generator for producing electrical power. The gas turbine 24 may include a turbine 30, a combustor or combustion chamber 32, and a compressor 34. However, the specific configuration of the gas turbine 24 may be implementation-specific and may include any number and configurations of turbine stages, compressor stages, and combustors. Although only a single gas turbine 24 is illustrated, the system 10 may include a plurality gas turbine engines 24.

In certain embodiments, for example during integrated operation, the gas turbine 24 may utilize syngas 35 generated in a gasifier 36 of the IGCC system as the fuel 26. In other embodiments, the gas turbine 24 may use back-up fuels 38 such as, but not limited to, natural gas, distillates, or a combination thereof as the fuel 26 (e.g., during non-integrated operation). As should be noted, the gas turbine 24 may also use a mixture of the syngas 35 and back-up fuels 38 as the fuel 26. The type of fuel 26 used by the gas turbine 24 may be determined based on the power requirements for the load 28. In certain embodiments, because a composition and temperature of the exhaust gas 20 may vary based on the type of fuel 26 used by the gas turbine 24, the HRSG 12 may include duct burners that heat the exhaust gas 20 to a desired temperature for efficient production of the steam in the HRSG 12.

The system 10 may also include a steam turbine 46 for driving a second load 48. Similar to the first load 28, the second load 48 may also be an electrical generator for generating electrical power. However, both the first load 28 and the second load 48 may be other types of loads capable of being driven by the gas turbine 24 and steam turbine 46. In addition, although the gas turbine 24 and steam turbine 46 may drive separate loads 28 and 48, as shown in the illustrated embodiment, the gas turbine 24 and steam turbine 46 may also be utilized in tandem to drive a single load via a single shaft.

In combined cycle systems such as system 10, hot exhaust (e.g., the exhaust gas 20) may flow from the gas turbine 24 and pass through the HRSG 12 to generate high-pressure, high-temperature steam, such as superheated steam. The steam produced by the HRSG 12 may then be passed through the steam turbine 46 for power generation. In addition, the produced steam may also be supplied to any other processes that use superheated steam. The gas turbine 24 generation cycle is often referred to as the "topping cycle," whereas the steam turbine 46 generation cycle is often referred to as the "bottoming cycle." By combining these two cycles as illustrated in FIG. 1, the system 10 may lead to greater efficiencies in both cycles. In particular, exhaust heat from the topping cycle may be captured and used to generate steam for use in the bottoming cycle.

The system 10 includes a controller 56 (e.g., an electronic and/or processor-based controller) to govern operation of the system 10. The controller 56 may be part of a distributed control system for the power plant. The controller 56 may independently control operation of the system 10 based on at least feedback received from sensors (e.g., temperature and pressure sensors), control valves, and pumps, or other features throughout the system 10 (gas turbine 24). Each controller 56 includes a memory 60 (e.g., a non-transitory computer-readable medium/memory circuitry) communicatively coupled to a processor 58. Each memory 60 stores one or more sets of instructions (e.g., processor-executable instructions) implemented to perform operations related to the components of the system 10 (e.g., for predicting and enhancing a startup time of the power plant or individual gas turbine engines 24, causing display of the startup time and related information on a display, etc.). More specifically, the memory 60 may include volatile memory, such as random access memory (RAM), and/or non-volatile memory, such as read-only memory (ROM), optical drives, hard disc drives, or solid-state drives. Additionally, the processor 58 may include one or more application specific integrated circuits (ASICs), one or more field programmable gate arrays (FPGAs), one or more general-purpose processors, or any combination thereof. Furthermore, the term processor is not limited to just those integrated circuits referred to in the art as processors, but broadly refers to computers, processors, microcontrollers, microcomputers, programmable logic controllers, application specific integrated circuits, and other programmable circuits. The controller 56 is coupled to service platform 62. The service platform 62 may be a software platform for collecting data from the system 10. In certain embodiments, the service platform 62 may be a cloud-based platform such as a service (PaaS). In certain embodiments, the service platform 62 may perform industrial-scale analytics to analyze performance of and enhance or improve operation (e.g., startup) of both the power plant 10 and each component (e.g., gas turbine engine 24) of the power plant 10. The service platform 62 is coupled to a database 64. The database 64 and/or the memory 60 may store historical data related to the system 10, one or models, and other data. For example, the database and/or the memory may store a model (e.g., a physics based model) for predicting and enhancing the startup time of the power plant and the gas turbine engines 24 as described in greater detail below.

Figure 2:
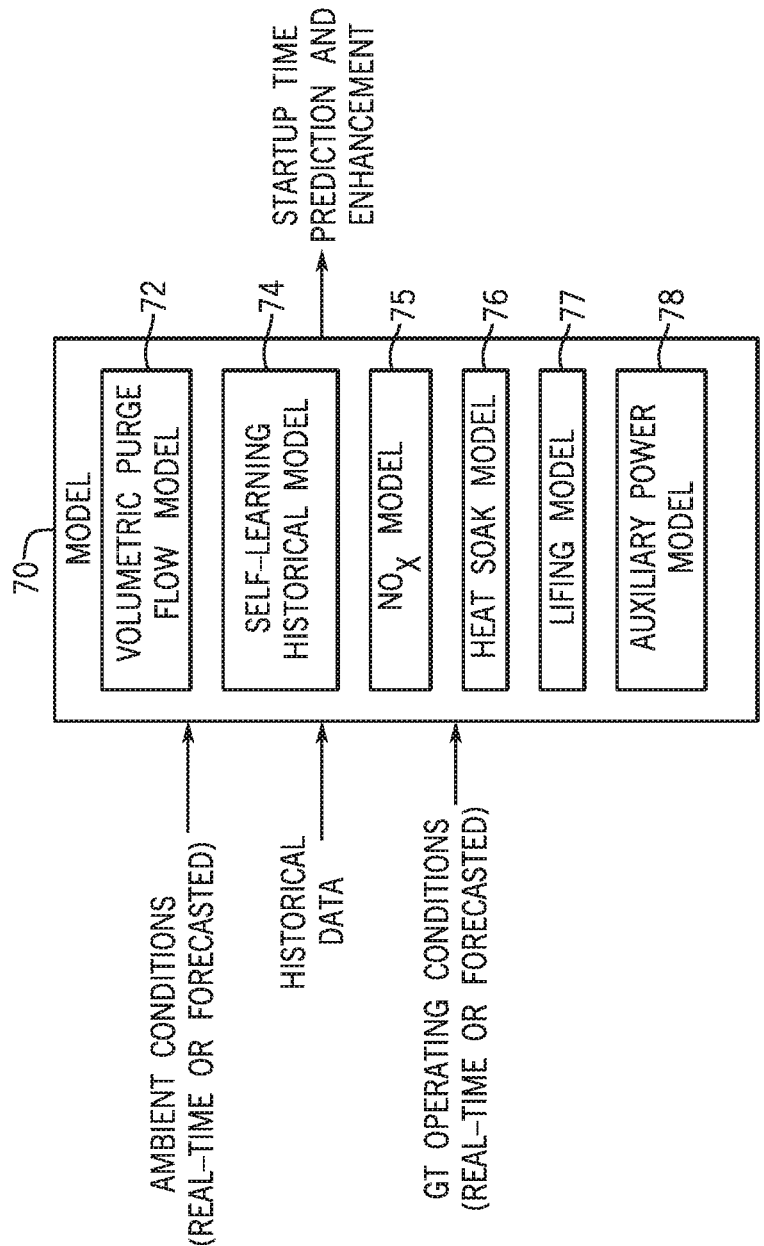
FIG. 2 is a schematic diagram of an embodiment of a model for predicting and enhancing a startup time for a combined cycle system.

FIG. 2 is a schematic diagram of a model 70 for predicting and enhancing (e.g., improving) a startup time for the combined cycle system 10 and/or gas turbine engines 24.

The model 70 may be a physics based model. Inputs to the model 70 include ambient conditions for the system 10 (e.g., pressure, temperature, etc.), historical data (e.g., related to purge duration, etc.) and input (e.g., from sensors throughout the system 10) related to the operating conditions of the gas turbine engines 24. For example, the model 70 may utilize heat soak variations, different ambient conditions, air flow conditions, data related to frame blowers, variable speed purge, inlet guide vane modulation at purge speed, variable acceleration rate, and variable load rate. The model 70 may predict and enhance a duration of a startup time for each gas turbine engine 24 at a current time and future times. In certain embodiments, the model 70 may determine a startup order for gas turbine engines 24 of the power plant. The model 70 may forecast the best date for an outage to better balance the hardware life consumption of components of the power plant when the outage occurs. The model 70 may determine the best (e.g., most efficient) time to start up the gas turbine engines 24 to reduce the auxiliary power consumed and $NO_x$ reduction during startup.

The model 70 includes a volumetric purge flow model 72, a self-learning historical model 74, a heat soak model 76, $NO_x$ model 75, lifing model 77, and an auxiliary power reduction model 78 that together and/or individually enable predicting and enhancing (e.g., improving) a startup time for the combined cycle system 10 and/or gas turbine engines 24. The volumetric purge flow model 72 determines an air flow through the system 10 (e.g., gas turbine engine 24 and HRSG 12 or gas turbine engine 24). In particular, the volumetric purge flow model 72 determines the air flow (e.g., purge flow) based on shaft speed at different ambient conditions (e.g., pressure, temperature, etc.) and enables determining a purge cycle completion that enables a purge flow to end substantially and simultaneously with the turbine 30 reaching firing speed. The self-learning historical model 74 along with volumetric model may be utilized to reduce the error on the predict startup duration for the combined cycle unit based on historical data. The heat soak model 76 determines a rate of reduction of exhaust temperature and its impact on the startup duration. Air density variations based on the type of start for the gas turbine engine (e.g., hot start, warm start, cold start) may be utilized to determine heat soak benefits. Under cold ambient conditions, the density of air would be higher than under hot ambient conditions resulting in a higher mass flow. Under hot ambient conditions, the density of air would be less resulting in a higher volumetric flow rate. This will help in determining the best startup time and minimizing gas turbine startup time. The auxiliary power reduction model enables a prediction or determination of an amount of power saved by starting up a gas turbine at a particular time under different conditions. The $NO_x$ model 75 enables a prediction or determination of an amount of $NO_x$ saved (i.e., reduction in $NO_x$) by starting up a combined cycle gas turbine at a particular time under different conditions. The lifing model 77 enables a prediction or determination of an impact on the hardware life consumption of combined cycle gas turbine system by starting up the combined cycle gas turbine at a particular time under different conditions.

Figure 3:
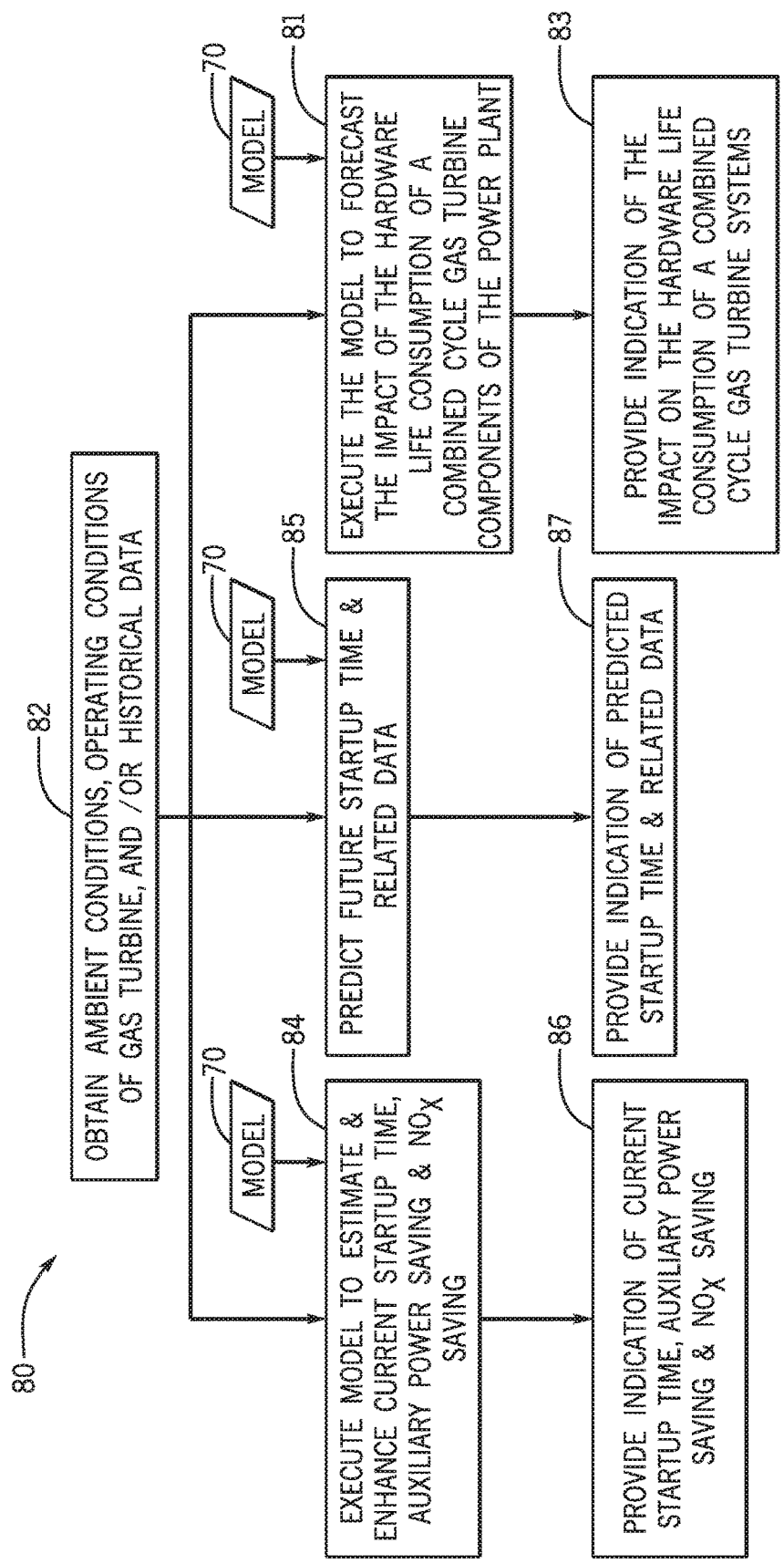
FIG. 3 is a flow diagram an embodiment of a method for predicting and enhancing a startup time for a single combined cycle system.

FIG. 3 is a flow diagram of a method 80 for predicting and enhancing (e.g., improving) a startup time for a single combined cycle system 10 (e.g., having a single gas turbine engine 24). The method 80 may be performed by the controller 56 and/or the service platform 62. One or more steps of the method 80 may be performed simultaneously or in a different sequence from the sequence in FIG. 3. The method 80 includes obtaining one or more signals (e.g., from sensors) representative of ambient conditions (e.g., pressure, temperature, etc.) and one or more operating conditions of the gas turbine engine 24 (block 82). In certain embodiments, historical data may be obtained (e.g., from memory 60 and/or database 64) related to the gas turbine engine 24 and/or the system 10.

The method 80 also includes executing the model 70 to predict and enhance a current duration of a startup time startup times for the gas turbine 24 along with auxiliary power and $NO_x$ savings (block 84). The method 80 also includes executing the model 70 to predict future startup times (e.g., durations) and related data (block 85). In certain embodiments, the model 70 may predict future startup times (taking into account heat variations) under different conditions (e.g., cold startup, warm startup, hot startup). In certain embodiments, the model 70 may determine the best (e.g., most efficient) startup time (e.g., to minimize startup, to increase auxiliary power savings, to balance hardware life consumption, etc.) within the current shift or day or the next period of time (e.g., 24 hours). As mentioned above, the model 70 may utilize the exhaust volumetric flow model 72 to determine an air flow of the gas turbine engine 24 utilizing shaft speed at different ambient conditions. The model 70 may also predict a purge duration for the gas turbine engine 24 during the startup time (e.g., utilizing model 74). The model 70 may also determine a rate of reduction of exhaust temperature and its impact on the purge duration (e.g., utilizing model 76). The model 70 may further predict an amount of power saved and $NO_x$ (e.g., utilizing model 78) by starting up the gas turbine engine 24 at a particular time (e.g., at a best time during a day or shift).

The method 80 further includes providing an indication of the current startup time and related data (e.g., auxiliary power and $NO_x$ savings) for the gas turbine engine 24 (block 86) and providing an indication of a predicted startup time and related data (block 87). For example, a duration of a current startup time, duration of future startups times within the next shift or period of time (e.g., 24 hours) under different conditions (e.g., cold start, warm start, hot start), an indication of purge time (e.g., past, current, best, etc.), and/or indication of an amount of auxiliary power and $NO_x$ saved for the different startup times (current and present) may be displayed on a display of a device (e.g., controller 56 or another device coupled to the service platform 62). In certain embodiments, a current operational status of the gas turbine engine 24 may be provided (e.g., purge, startup, shut down, etc.). In certain embodiments, a graphical display may indicate how much time of a startup time has passed relative to the total startup time.

The method 80 even further includes executing the model 70 to forecast the impact of hardware life consumption of the components of the system 10 (e.g., gas turbines 24) (block 81). The method 80 includes providing an indication of the impact on the hardware life consumption of combined cycle gas turbine system (block 83). For example, the indication of the hardware life consumption may be displayed on a display of a device (e.g., controller 56 or another device coupled to the service platform 62).

Figure 4:
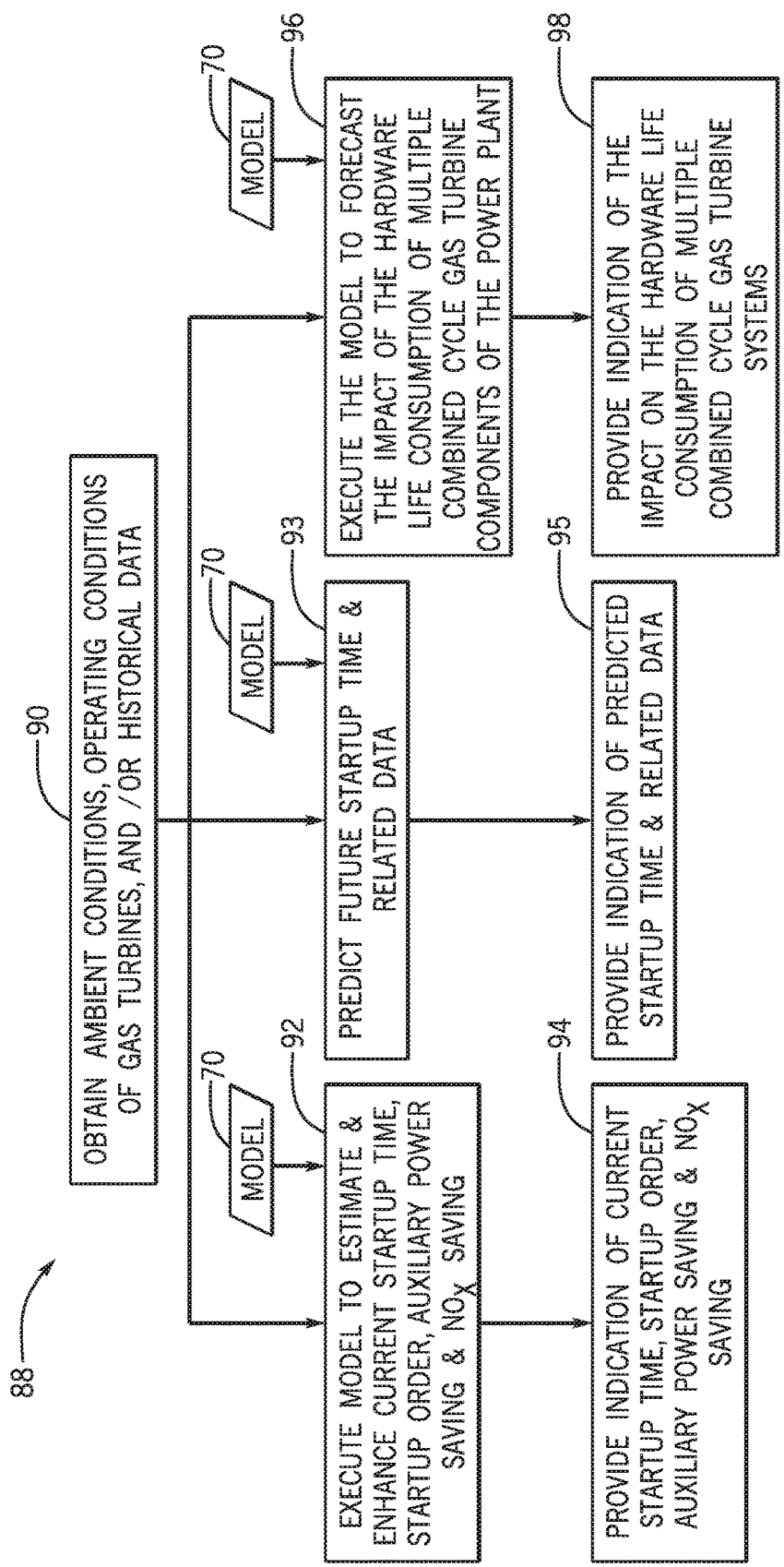
FIG. 4 is a flow diagram of an embodiment of a method for predicting and enhancing a startup time for multi-unit combined cycle system.

FIG. 4 is a flow diagram of a method 88 for predicting and enhancing (e.g., improving) a startup time for a multi-unit combined cycle system 10 and its gas turbine engines 24. The method 88 may be performed by the controller 56 and/or the service platform 62. One or more steps of the method 88 may be performed simultaneously or in a different sequence from the sequence in FIG. 4. The method 88 includes obtaining one or more signals (e.g., from sensors) representative of ambient conditions (e.g., pressure, temperature, etc.) and one or more operating conditions of the gas turbine engines 24 (block 90). In certain embodiments, historical data may be obtained (e.g., from memory 60 and/or database 64) related to the gas turbine engines 24 and/or the system 10.

The method 88 also includes executing the model 70 to predict and enhance (e.g., improve) a current duration of a startup time for each of the gas turbine engines 24 along with an auxiliary power and $NO_x$ savings (block 92). In certain embodiments, the model 70 may determine a startup order of the plurality of gas turbine engines 24 to enhance (e.g., improve) an overall plant startup time. The method 88 also includes executing the model to predict future startup times (e.g., durations) and related data (block 93). In certain embodiments, the model 70 may predict future startup times (taking into account heat variations) under different conditions (e.g., cold startup, warm startup, hot startup) for each gas turbine engine 24. In certain embodiments, the model 70 may determine the best (e.g., most efficient) startup time (e.g., to minimize startup, to increase auxiliary power savings, to balance hardware life consumption, etc.) within the current shift or day or the next period of time (e.g., 24 hours) for each gas turbine engine 24. As mentioned above, the model 70 may utilize the exhaust volumetric flow model 72 to determine an air flow of each gas turbine engine 24 utilizing shaft speed at different ambient conditions. The model 70 may also predict a purge duration for each gas turbine engine 24 during the startup time (e.g., utilizing model 74). The model 70 may also determine a rate of reduction of exhaust temperature and its impact on the purge duration (e.g., utilizing model 76). The model 70 may further predict an amount of power saved and $NO_x$ reduction (e.g., utilizing model 78) by starting up each gas turbine engine 24 at a particular time (e.g., at a best (e.g., most efficient) time during a day or shift).

The method 88 further includes providing an indication of the startup order, startup times, and related data (e.g., auxiliary power and $NO_x$ savings) for the gas turbine engines 24 (block 94) and providing an indication of a predicted startup time and related data (block 95). For example, a duration of a current startup time, duration of future startups times within the next shift or period of time (e.g., 24 hours) under different conditions (e.g., cold start, warm start, hot start), an indication of purge time (e.g., past, current, best, etc.), and/or indication of an amount of auxiliary power and $NO_x$ saved for the different startup times (current and present) may be displayed on a display of a device (e.g., controller 56 or another device coupled to the service platform 62). In certain embodiments, a current operational status of each gas turbine engine 24 may be provided (e.g., purge, startup, shut down, etc.). In certain embodiments, a graphical display may indicate how much time of a startup time has passed relative to the total startup time. In certain embodiments, cumulative data may be provided for each gas turbine engine 24 (e.g., number of starts, time saved, power saved, etc.). Also, the ambient conditions (e.g., pressure, temperature, etc.) may also be provided.

The method 88 even further includes executing the model 70 to forecast the impact of hardware life consumption of the components of the system 10 (e.g., gas turbines 24) (block 96). The method 88 includes providing an indication of the impact on the hardware life consumption of combined cycle gas turbine system (block 98). For example, the indication of the hardware life consumption may be displayed on a display of a device (e.g., controller 56 or another device coupled to the service platform 62).

Figure 5:
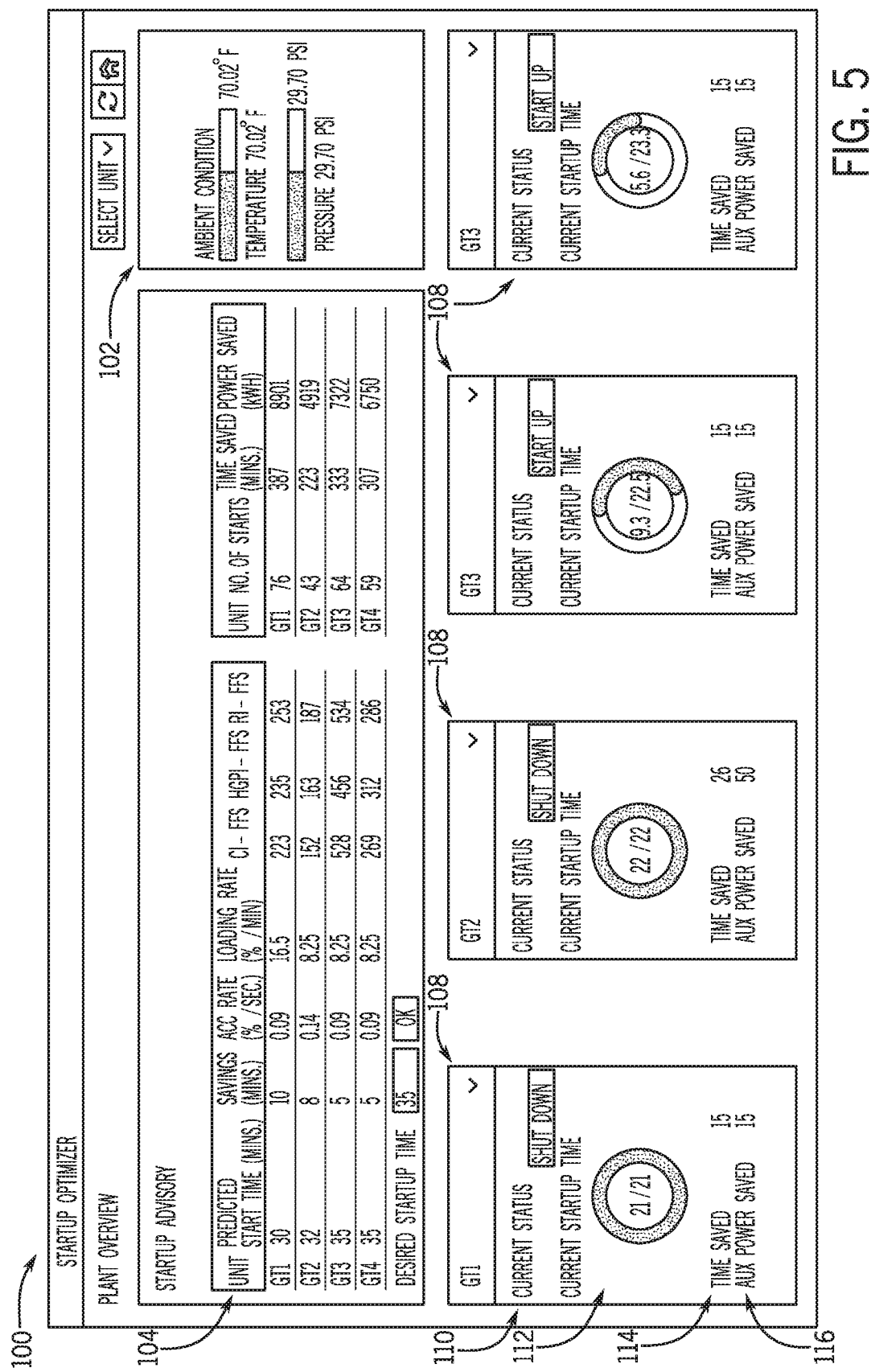
FIG. 5 is a screenshot of an embodiment of a graphical user interface (GUI) for managing startup time, estimating the aux power and $NO_x$ reduction, and forecasting the impact on a life of combined cycle gas turbine system.

FIG. 5 is a screenshot of an embodiment of a graphical user interface (GUI) 100 for managing startup time for a combined cycle system 10, estimating the aux power and $NO_x$ reduction, and forecasting the impact on a life of combined cycle gas turbine system. A similar GUI can be utilized for a single gas turbine engine. Also, in certain embodiments, the GUI 100 may include additional items or fewer items than shown in FIG. 5. As depicted in FIG. 5, the GUI 100 provides indicators 102 of the ambient conditions (e.g., pressure and temperature) for the system 10. The indicator 102 may provide the value of the real-time ambient conditions and/or a graphical representation of the value of the ambient conditions. The GUI 100 also provides a startup order or advisory 104 illustrating a recommended or predicted startup order for each gas turbine engine 24 as well as related information (e.g., time savings, acceleration rate, loading rate, etc.). The GUI 100 further provides cumulative startup data for each of the gas turbine engines 24. The cumulative startup data may include a number of starts, time saved, $NO_x$ saved, and/or power saved.

The GUI 100 provides sections 108 with related information for each gas turbine engine 24. Each section 108 may include an indicator 110 of a current status of the gas turbine engine (e.g., purge, startup, shutdown, etc.). Each section 108 may include an indicator 112 of the current or last startup time. The indicator 112 may include a graphical indicator and/or values of the amount of the startup time that has passed versus an overall predicted time for the startup. Each section 108 may also include an indicator 114 of time saved, $NO_x$ saved, and/or an indicator 116 of auxiliary power saved during the current or last startup time. Also, each section 108 includes predicted startup times 118 and associated data (e.g., time saved, power saved, start time, end time, $NO_x$ saved, etc.) at future times (e.g., within a given time period (e.g., 24 hours) or shift).

In certain embodiments, the GUI 100 may include an area 120 for a user to input a desired startup time. In other embodiments, the GUI may include areas where a user can input a desired time range, adjust parameters (e.g., acceleration rate, loading rate adjustment of a maintenance factor (i.e., an indication of hours before maintenance), an impact of the maintenance factor, etc.). In certain embodiments, the GUI 100 may display an indicator (e.g., life odometer) for the gas turbine engines that reflects the consumption of the life of the gas turbine engines.

Technical effects of the invention include providing systems and methods that enhance a startup time of a power plant and its associated gas turbine engines. In particular, a model (e.g., physics based model) may be executed that predicts current and future startup times of the gas turbine engines. The model also determines the best (e.g., most efficient) times for starting up the gas turbine engine. The model may also provide a startup order for the gas turbine engines to enhance (e.g., reduce) the overall plant startup time. Besides reducing the time of plant (and gas turbine) startup, the model may predict and determine auxiliary power, and $NO_x$ savings. Further, the model may forecast a best outage date for the power plant to better balance the hardware life consumption when the outage occurs.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A non-transitory computer-readable storage medium storing one or more processor-executable instructions wherein the one or more instructions, when executed by a processor of a controller, cause acts to be performed comprising:
   obtaining, from sensors, one or more signals representative of ambient conditions for a gas turbine engine and one or more operating conditions of the gas turbine engine;
   executing a model to predict a duration of a startup time for the gas turbine engine based on the ambient conditions and the one or more operating conditions; and
   causing a display to display the predicted duration of the startup time of the gas turbine engine;
   wherein executing the model to predict the duration of the startup time comprises executing a historical-learning model to predict a purge duration for the gas turbine engine during the startup time, and wherein executing the model to predict the duration of the startup time comprises executing a heat soak model to determine a rate of reduction of exhaust temperature and its impact on the purge duration; wherein the acts to be performed comprise controlling a power plant based on the predicted duration of the startup time for the gas turbine engine taking into account the purge duration for the gas turbine engine and the determined rate of reduction of exhaust temperature and its impact on the purge duration, wherein the power plant comprises the gas turbine engine.

2. The non-transitory computer-readable storage medium of claim 1, wherein the acts to be performed comprise executing the model to predict a current duration of a first startup time for the gas turbine engine and a future duration of a second startup time for the gas turbine engine based on the ambient conditions and the one or more operating conditions.

3. The non-transitory computer-readable storage medium of claim 1, wherein predicting the duration of the startup time comprises executing an exhaust volumetric flow model to determine an air flow of the gas turbine engine.

4. The non-transitory computer-readable storage medium of claim 3, wherein the exhaust volumetric flow model utilizes shaft speed of the gas turbine engine at different ambient conditions.

5. The non-transitory computer-readable storage medium of claim 1, wherein determining the rate of reduction of exhaust temperature and its impact on the purge duration is based at least on heat soak variations due to air density variations based on a temperature of the gas turbine engine during startup.

6. The non-transitory computer-readable storage medium of claim 1, wherein executing the model to predict the duration of the startup time comprises determining a particular time or shift during a particular time period for starting up the gas turbine engine, and wherein the acts to be performed comprise causing the display to display an indication of the particular time or shift for starting up the gas turbine engine.

7. The non-transitory computer-readable storage medium of claim 1, wherein executing the model to predict the duration of the startup time comprises executing an auxiliary power reduction model to predict and determine an amount of power saved by starting up the gas turbine engine at a particular time or shift.

8. The non-transitory computer-readable storage medium of claim 1, wherein executing the model to predict the duration of the startup time comprises executing a nitrogen oxides ($NO_x$) model to predict and determine an amount of $NO_x$ saved by starting up the gas turbine engine at a particular time or shift.

9. The non-transitory computer-readable storage medium of claim 1, wherein the one or more operating conditions comprise heat soak variations, air flow, frame blowers, variable speed purge, inlet guide vane modulation at purge speed, variable acceleration rate, and variable load rate.

10. A non-transitory computer-readable storage medium storing one or more processor-executable instructions wherein the one or more instructions, when executed by a processor of a controller, cause acts to be performed comprising:
    obtaining, from sensors, one or more signals representative of ambient conditions and one or more operating conditions for each gas turbine engine of a plurality of gas turbine engines of a power plant;
    executing a model to predict durations for startup times for each gas turbine engine of the plurality of gas turbine engines at different times or shifts for a particular time period based on the ambient conditions and the one or more operating conditions; and
    causing a display to display the predicted durations for the startup times for each gas turbine engine of the plurality of gas turbine engines at the different times or shifts during the particular time period;
    wherein the acts to be performed comprise executing the model to determine when an outage would be needed for the power plant, and providing an indication of when the outage would be needed; wherein the acts to be performed comprise controlling a power plant based on the predicted durations for startup times for each gas turbine engine of the plurality of gas turbine engines at different times or shifts for the particular time period, wherein the power plant comprises the plurality of gas turbine engines.

11. The non-transitory computer-readable storage medium of claim 10, wherein the acts to be performed comprise executing the model to determine a startup order of the plurality of gas turbine engines in the power plant to improve an overall plant startup time.

12. The non-transitory computer-readable storage medium of claim 10, wherein the acts to be performed comprise executing the model to determine time saved, nitrogen oxides ($NO_x$) saved, and auxiliary power saved for a respective gas turbine engine of the plurality of gas turbine engines for a current startup time, a past startup time, or a future startup time, and causing display on the display of the timed saved, $NO_x$ saved, and the auxiliary power saved.

13. The non-transitory computer-readable storage medium of claim 10, wherein the power plant comprises a combined cycle plant.

14. The non-transitory computer-readable storage medium of claim 10, wherein controlling the power plant based on the predicted durations for startup times for each gas turbine engine of the plurality of gas turbine engines at different times or shifts for the particular time period takes into account when the outage would be needed for the power plant.

15. A method for predicting and enhancing a startup time for a power plant, comprising:

obtaining from sensors, at a processor, one or more signals representative of ambient conditions and one or more operating conditions for each gas turbine engine of a plurality of gas turbine engines of the power plant;

executing, on the processor, a model to predict durations for startup times for each gas turbine engine of the plurality of gas turbine engines at different times or shifts for a particular time period based on the ambient conditions and the one or more operating conditions;

causing, via the processor, a display to display the predicted durations for the startup times for each gas turbine engine of the plurality of gas turbine engines at the different times or shifts during the particular time period;

executing the model to determine time saved, nitrogen oxides ($NO_x$) saved, and auxiliary power saved for a respective gas turbine engine of the plurality of gas turbine engines for a current startup time, a past startup time, or a future startup time, and causing display on the display of the timed saved, $NO_x$ saved, and the auxiliary power saved; and controlling, via the processor, the power plant based on the predicted durations for the startup times for each gas turbine engine of the plurality of gas turbine engines at the different times or shifts during the particular time period taking into account the determined time saved, NOx saved, and auxiliary power saved for the respective gas turbine engine of the plurality of gas turbine engines for the current startup time, the past startup time, or the future startup time, wherein the power plant comprises the plurality of gas turbine engines.

16. The method of claim 15, comprising executing the model to determine a startup order of the plurality of gas turbine engines in the power plant to improve an overall plant startup time.

17. The method of claim 15, comprising executing the model to determine when an outage would be needed for the power plant, and providing an indication of when the outage would be needed.

* * * * *